(12) United States Patent
Cornwall

(10) Patent No.: US 10,515,530 B2
(45) Date of Patent: Dec. 24, 2019

(54) GAS LEAK DETECTION AND LOCATION DETERMINATION

(71) Applicant: ITRON, INC., Liberty Lake, WA (US)

(72) Inventor: Mark K Cornwall, Spokane, WA (US)

(73) Assignee: ITRON, INC., Liberty Lake, WA (US)

( * ) Notice: Subject to any disclaimer, the term of this patent is extended or adjusted under 35 U.S.C. 154(b) by 31 days.

(21) Appl. No.: 15/903,182

(22) Filed: Feb. 23, 2018

(65) Prior Publication Data

US 2018/0182225 A1 Jun. 28, 2018

Related U.S. Application Data

(63) Continuation of application No. 14/984,088, filed on Dec. 30, 2015, now Pat. No. 9,928,720.

(51) Int. Cl.
*G08B 17/00* (2006.01)
*G08B 21/16* (2006.01)
*G01M 3/16* (2006.01)
*G01M 3/00* (2006.01)
(Continued)

(52) U.S. Cl.
CPC .............. *G08B 21/16* (2013.01); *G01D 21/00* (2013.01); *G01M 3/00* (2013.01); *G01M 3/16* (2013.01); *G01M 3/22* (2013.01)

(58) Field of Classification Search
CPC .......... G08B 21/16; G01M 3/16; G01M 3/00; G01M 3/22; G01D 21/00
USPC .......... 340/522, 870.07, 628, 632, 933, 501, 340/511, 532, 686.6, 539.11, 605, 539.26, 340/521, 5.54; 455/3.05, 7, 418
See application file for complete search history.

(56) References Cited

U.S. PATENT DOCUMENTS

| 7,259,656 B1 | 8/2007 | Wright |
| 7,679,052 B2 | 3/2010 | Blanchard |
| 7,911,010 B2 | 3/2011 | Stetter |

(Continued)

FOREIGN PATENT DOCUMENTS

| EP | 2661093 A2 | 11/2013 |
| WO | 2006099632 A2 | 9/2006 |
| WO | 2012105423 A1 | 8/2012 |

OTHER PUBLICATIONS

"Gas Archives—Heath Consultants," Products, Gas, found at <http://heathus.com/product_category/gas/>, printed Dec. 29, 2015, 4 pages.
(Continued)

*Primary Examiner* — Dhaval V Patel

(57) ABSTRACT

A method of gas detection includes sending, by a gas sensing device to a data collection device, reports of detected concentrations of a particular gas by an associated gas sensor of the gas sensing device per a predetermined schedule or in response to an unscheduled request by the data collection device. The method may include determining whether a latest detected gas concentration is greater than a predetermined threshold, and if so, automatically sending updated reports of detected gas concentrations to the data collection device at a rate faster than that provided by the predetermined schedule. The method may further include determining whether a tracked rate that the gas concentration is changing indicates a decrease in concentration of the gas at a rate at which there is no safety concern, and if so, clearing an over-threshold alarm. A gas sensing device is also presented.

20 Claims, 9 Drawing Sheets

(51) Int. Cl.
*G01D 21/00* (2006.01)
*G01M 3/22* (2006.01)

(56) References Cited

U.S. PATENT DOCUMENTS

| | | | |
|---|---|---|---|
| 8,105,539 | B2 | 1/2012 | Buttner et al. |
| 8,284,049 | B2 | 10/2012 | Blanchard |
| 8,310,016 | B2 | 11/2012 | Stetter |
| 8,426,932 | B2 | 4/2013 | Stetter |
| 8,795,484 | B2 | 8/2014 | Stetter et al. |
| 8,884,382 | B2 | 11/2014 | Stetter et al. |
| 9,322,735 | B1 | 4/2016 | Tan et al. |
| 9,910,023 | B2 * | 3/2018 | Ui .................. G01N 33/0047 |
| 2004/0173006 | A1 * | 9/2004 | McCoy ............. G01M 3/225 73/40.7 |
| 2007/0000310 | A1 | 1/2007 | Yamartino et al. |
| 2007/0139183 | A1 * | 6/2007 | Kates .................. G08B 25/005 340/521 |
| 2008/0168826 | A1 | 7/2008 | Saidi et al. |
| 2010/0090828 | A1 | 4/2010 | Blanchard |
| 2012/0125772 | A1 | 5/2012 | Stetter et al. |
| 2014/0311905 | A1 | 10/2014 | Stetter et al. |
| 2015/0170503 | A1 | 6/2015 | Wedig et al. |
| 2015/0192554 | A1 | 7/2015 | Koop et al. |
| 2015/0235539 | A1 * | 8/2015 | Orvis .................. G01N 33/004 340/632 |

OTHER PUBLICATIONS

"Gas Archives—p. 2 of 4—Heath Consultants," Products, Gas, found at <http://heathus.com/product_category/gas/page/2/>, printed Dec. 29, 2015, 4 pages.
"Gas Archives—p. 3 of 4—Heath Consultants," Products, Gas, found at <http://heathus.com/product_category/gas/page/3/>, printed Dec. 29, 2015, 5 pages.
"Gas Archives—p. 4 of 4—Heath Consultants," Products, Gas, found at <http://heathus.com/product_category/gas/page/4/>, printed Dec. 29, 2015, 3 pages.
"KWJ Engineering << MEMS," found at <http://www.kwjengineering.com/home/a-powerful-partner/mems>, undated, copyright KWJ Engineering, printed Dec. 30, 2015, 3 pages.
KWJ Engineering Inc., "An Ultra-Low Power Fast-Response Nano-TCD CH4 Sensor for UAV Airborne Measurements | NASA Phase I: NNX14CC84P," found at < http://www.kwjengineering.com/wp-content/uploads/2014/08/NASA-MEMS-Project-Summary.pdf>, undated, obtained Dec. 29, 2015, 1 page.
KWJ Engineering Inc., "Low Power Nano-Sensor Based Measurement of Atmospheric Nitrogen and Argon | DOE Phase | SBIR, Award No. DE-SC0011263," found at < http://www.kwjengineering.com/wp-content/uploads/2014/08/DOE-Ar-N2-Sensors-Project-Summary.pdf>, undated, obtained Dec. 30, 2015, 1 page.
KWJ Engineering Inc., "OTD: Mems Ultra Low Power Methane Thermal Conductivity Sensor," found at <http://www.kwjengineering.com/wp-content/uploads/2014/08/OTD-Project-Summary.pdf>, undated, obtained Dec. 29, 2015, 1 page.
International Search Report and Written Opinion dated Apr. 13, 2017, for PCT International Patent Application No. PCT/US2016/067544, 15 pages.
Non-Final Office Action dated Aug. 19, 2016, for U.S. Appl. No. 14/984,088, 14 pages.
Final Office Action dated Jan. 26, 2017, for U.S. Appl. No. 14/984,088, 20 pages.
Advisory Action dated Apr. 7, 2017, for U.S. Appl. No. 14/984,088, 3 pages.
Non-Final Office Action dated Jun. 12, 2017, for U.S. Appl. No. 14/984,088, 18 pages.
Notice of Allowance dated Nov. 14, 2017, for U.S. Appl. No. 14/984,088, 8 pages.
International Preliminary Report on Patentability for PCT/US2016/067544, dated Jul. 12, 2018, 10 pages.
Extended European Search Report dated Mar. 6, 2019, for European Patent Application No. 18197819.8, 5 pages.

* cited by examiner

GAS LEAK DETECTION AND LOCATION DETERMINATION

CROSS-REFERENCE TO RELATED MATTERS

This application is a continuation of U.S. patent application Ser. No. 14/984,088, filed Dec. 30, 2015, and entitled "Gas Leak Detection and Location Determination," which is incorporated herein by reference in its entirety.

FIELD OF THE DISCLOSURE

This disclosure relates generally to gas sensing and leak detection in a communications network.

BACKGROUND

Natural gas (i.e., methane ($CH_4$)) is considered one of the cleanest, safest, and most useful of energy sources. When burned, it produces a great deal of energy with fewer emissions than many other energy sources, and therefore it has many uses in residential, commercial, and industrial applications. One reason that natural gas is considered safe is its narrow combustion limits, which ensures predictability in use. Natural gas will only ignite when air contains between five and fifteen percent natural gas. Due to its combustible nature, however, there is still a risk of explosion when using natural gas, which makes it very important to quickly determine where gas leaks may be occurring. Other gases have similar properties and risks. There are some gas detection sensors currently available and/or currently being developed. However, these sensors are either high in power consumption, high in cost, or both. Widespread application of such sensors (e.g., one or more at every home, business, etc.) could be quite costly, and in some applications (e.g., for use with gas utility meters, which typically run on battery power) may not even be feasible.

Figure 1:
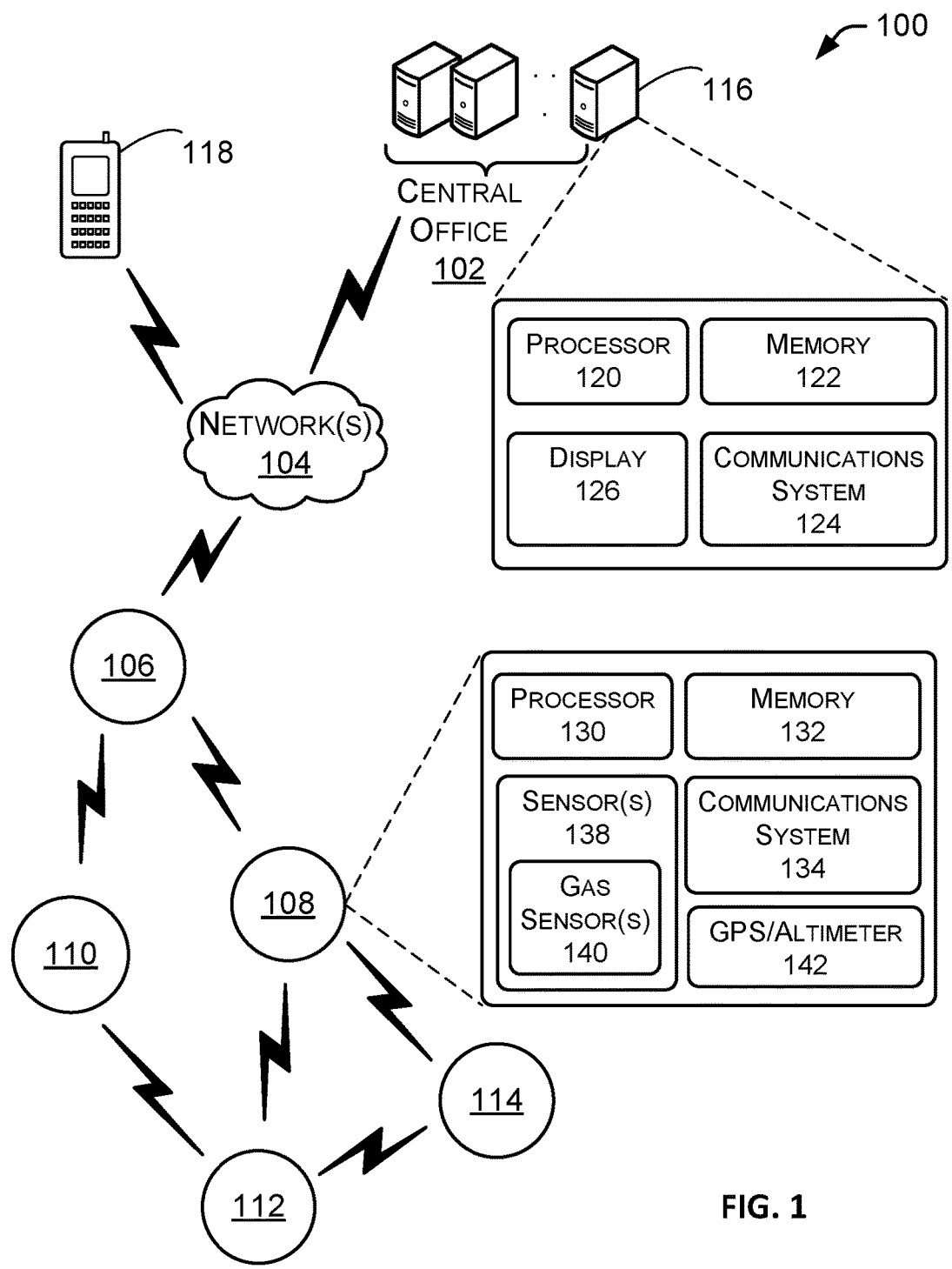
FIG. 1 is an illustration of a network environment in which example methods, apparatus, and articles of manufacture disclosed herein may be implemented, according to embodiments of this disclosure.

In the drawings, the leftmost digit(s) of a reference number may identify the drawing in which the reference number first appears.

DETAILED DESCRIPTION

As lower cost, low power-consumption sensors (e.g., micro-electro-mechanical systems (MEMS) sensors), including some gas sensors, are being developed, useful applications for such sensors are needed. The following description discloses gas leak detection applications in a communication system environment that may provide swift pin-pointing of a location of a gas leak as well as other information that may minimize the risk of explosion and help save both lives and property.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that the technology disclosed herein can also be employed in a variety of other systems and applications other than what is described herein.

FIG. 1 illustrates an example data collection network 100 (e.g., an advanced meter reading (AMR) network or other similar network), according to embodiments. The network 100 may include a central office 102, which may be associated with a data collection/processing entity (e.g., a utility company in the case of an AMR network). The central office may communicate with network nodes through one or more networks 104, which may be the Internet or other network having widespread or local functionality. Network nodes may include nodes 106-114, which may include, for example, endpoint devices such as utility meters or other devices that may comprise sensors, actuators, etc. (e.g., gas sensing devices). These nodes/devices may be located at various locations (e.g., homes, businesses, etc.). Nodes/devices 106-114 may be configured in a mesh network, star network or other configuration. One or more of the network nodes (e.g., device 106) may be a data collector and/or concentrator that may be configured for communication (e.g., radio frequency (RF) communication, cellular communication, etc.) with a plurality of downstream devices 108-114, which may also be configured for similar communications. In an example operation, data collector 106 may receive data or other communications from endpoint devices 108-114 to be provided to a data collection device 116, (which may be located at central office 102) and/or a mobile data collection device 118, and vice versa. For example, for an AMR network, the collected data may include consumption data or other information associated with a utility meter (e.g., a gas utility meter), such as detected concentration amounts of a particular gas in the air. Additionally, data collector 106 may send software updates, firmware updates, instructions or other information (which may have been communicated to data collector 106 from data collection device 116 or 118, for example) to one or more of the endpoint devices 108-114. In an embodiment, one or more network nodes (e.g., devices 106-114) may be battery-operated devices.

In an expanded view, data collection device 116 (and/or mobile data collection device 118) may include, among other components, one or more controllers or processors 120, a memory 122, a communication system 124 (e.g., configured for RF communications, cellular communications, or another type of communications), and a display 126. Devices 106-114 may include, among other components, one or more controllers or processors 130, a memory 132, a communication system 134 (e.g., configured for RF communications, cellular communications, or another type of communications), and one or more sensors 138, which may include at least one gas sensor 140. Devices 106-114 may also include a global positioning system (GPS) and/or an altimeter device 142 to determine the location and/or altitude of the device.

Figure 2:
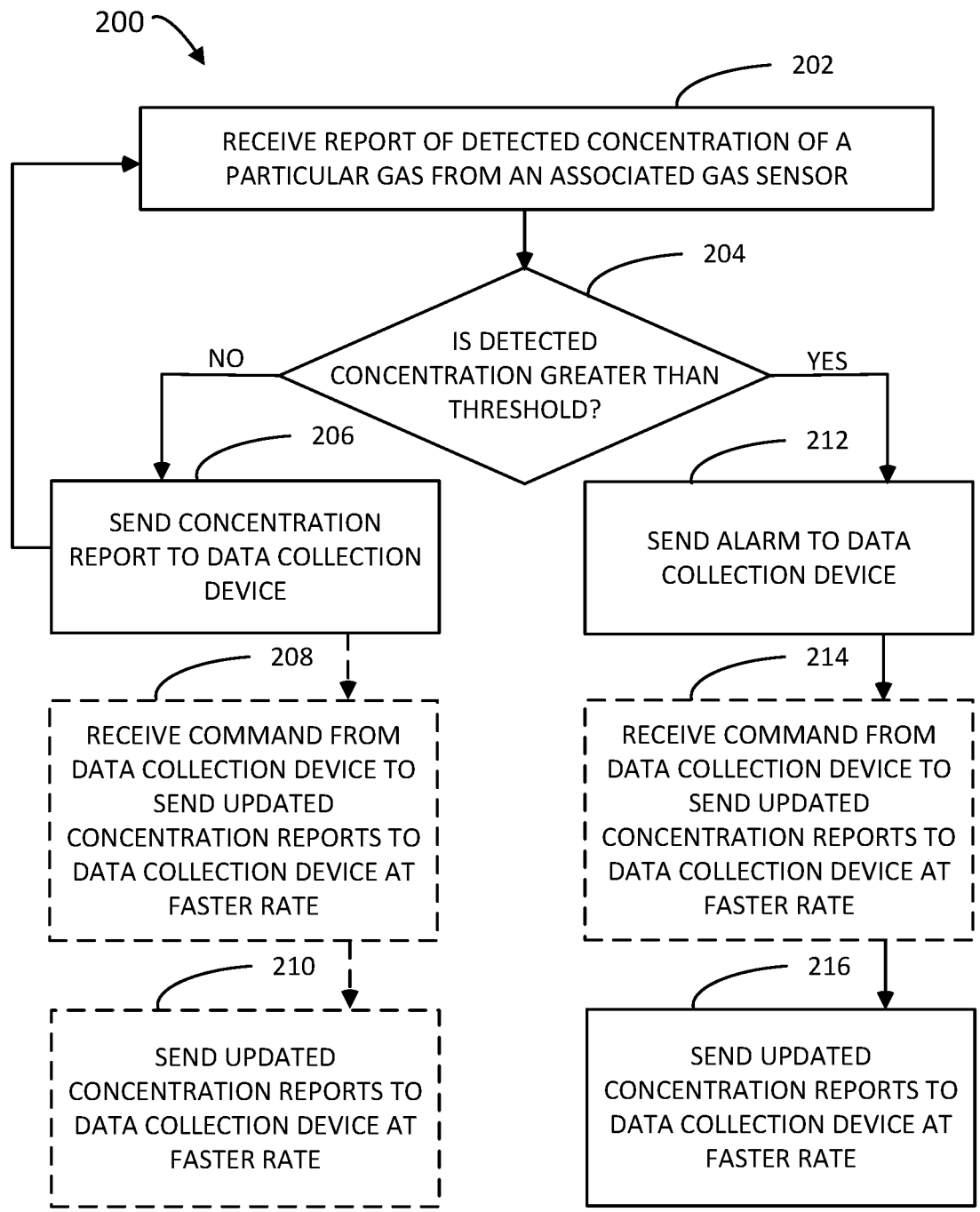
FIG. 2 is a flow diagram of an example gas leak detection process from the perspective of a gas sensing device, according to embodiments of this disclosure.

FIG. 2 is a flow diagram of an example gas leak detection process 200 from the perspective of a gas sensing device (e.g., devices 106-114), according to embodiments. At 202, a detected concentration amount (e.g., in parts per million (ppm) or as a percentage of the surrounding air) of a particular gas (e.g., methane) may be received from a gas sensor associated with the gas sensing device. (In embodiments discussed herein, a detected concentration amount may be alternatively measured and/or presented as a percentage of the Lower Explosive Level (LEL) of the gas, at which 100% LEL is an amount at which there will be an explosion if a spark is present, and at about 10% LEL, the measured gas concentration may be considered great enough to indicate presence of the gas with a need to alarm and/or prompt an investigation.) At 204, it may be determined whether the detected concentration is greater than a predetermined threshold. For example, for methane, which may ignite at 5%, the predetermined threshold may be set at a value lower than 5% (e.g., 0.5% or 5000 ppm). If the detected concentration is greater than the threshold, at 212, an alarm may be sent to a data collection device (e.g., device 116 and/or 118). A detected concentration greater than the threshold may indicate a possible (and potentially dangerous) gas leak and is reported as it may warrant further investigation. Due to potential urgency, updated gas concentration reports may be sent to the data collection device at a faster rate than its normal reporting schedule at 216. This may be done automatically by the gas sensing device, or in an alternative embodiment, this may be done in response to receiving a command (at 214) from the data collection device to send updates of detected concentration at the faster rate. Referring back to decision block 204, if the detected concentration is not greater than the predetermined threshold, at 206, the detected concentration may be provided to the data collection device (e.g., per its normal reporting schedule), and processing may return to 202, where the next gas concentration report may be received. In an embodiment, the gas sensing device may receive a command from the data collection device to send updates of detected concentration at a faster rate than its normal reporting schedule (at 208). This command may have been sent by the data collection device in response to the data collection device receiving an alarm from another (e.g., neighboring or nearby) gas sensing device that its detected concentration of the gas was greater than the predetermined threshold. In response to the command at 208, the gas sensing device may send updates of detected concentration to the data collection device at the faster rate at 210. In an alarm situation, it may be very useful for investigative purposes to also collect data from neighboring or nearby gas sensing devices in order to more quickly identify the location of a possible (and potentially dangerous) gas leak. An alarm may be cleared, or cancelled, by the data collection device, or by the gas sensing device, if there is no longer any safety risk, for example. Once an alarm is cancelled, the gas sensing device may go back to its normal reporting schedule.

Figure 3:
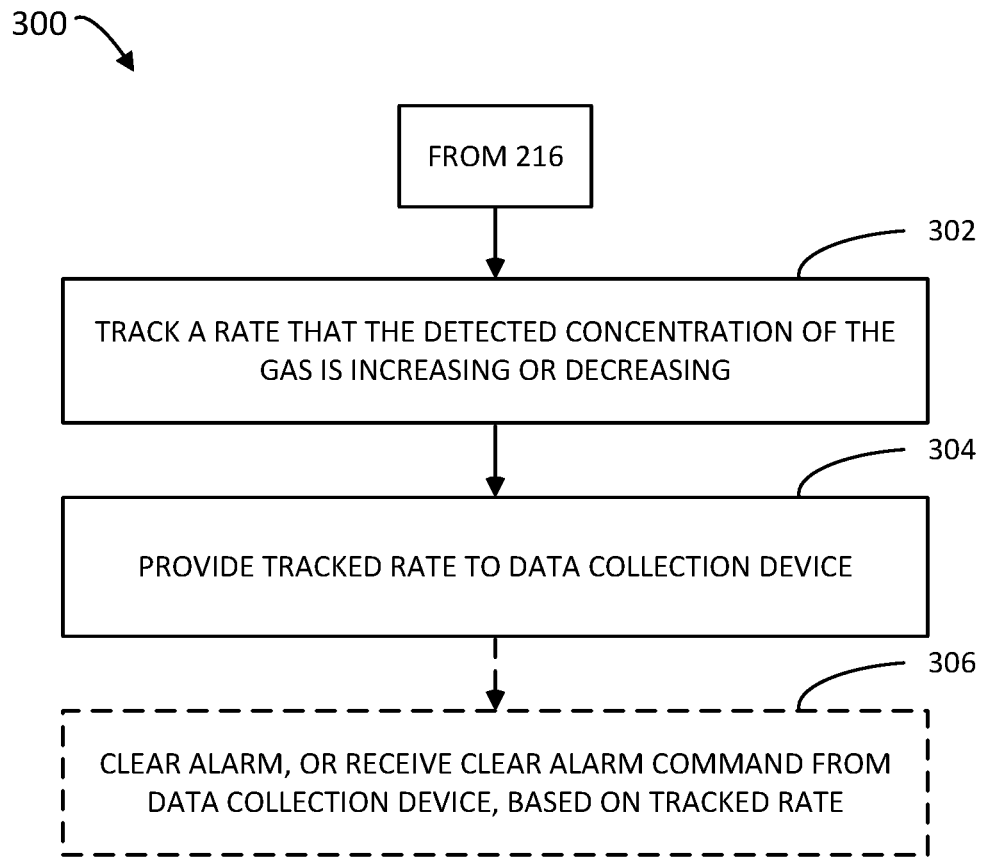
FIG. 3 is a flow diagram of an example leak rate tracking process from the perspective of a gas sensing device, according to embodiments of this disclosure.

FIG. 3 is a flow diagram of an example leak rate tracking process 300 from the perspective of a gas sensing device (e.g. any of devices 106-114), according to embodiments. Process 300 begins from block 216 of process 200 of FIG. 2. At 302, the gas sensing device may track a rate that the concentration of the gas is increasing or decreasing. At 304, the tracked rate may be sent to the data collection device (device 116 and/or 118). In an embodiment, the data collection device may determine from the tracked rate that the concentration of the gas is decreasing at a rate such that it no longer presents a safety concern. This may occur, for example, if a leak was repaired, if the gas was shut off in the location of the leak, or if the gas was detected due to the gas supply system providing temporary (usually very brief) venting in order to relieve built-up pressure in the system. If the data collection device determines there is no longer a safety risk, it may send a command to the gas sensing device to clear the alarm. Thus, at 306, a clear alarm command may be received from the data collection device. In an embodiment, the gas sensing device itself may determine that the tracked rate does not pose, or no longer poses, a safety concern and may clear the error itself and/or send a message to the data collection device that the alarm has been cancelled. In an embodiment, the tracked rate may be determined prior to an alarm being sent to the data collection device. If the tracked rate shows that the concentration of the gas is decreasing at a rate such that it does not present, or no longer presents, a safety concern, an alarm may not need to be sent to the data collection device.

Figure 4:
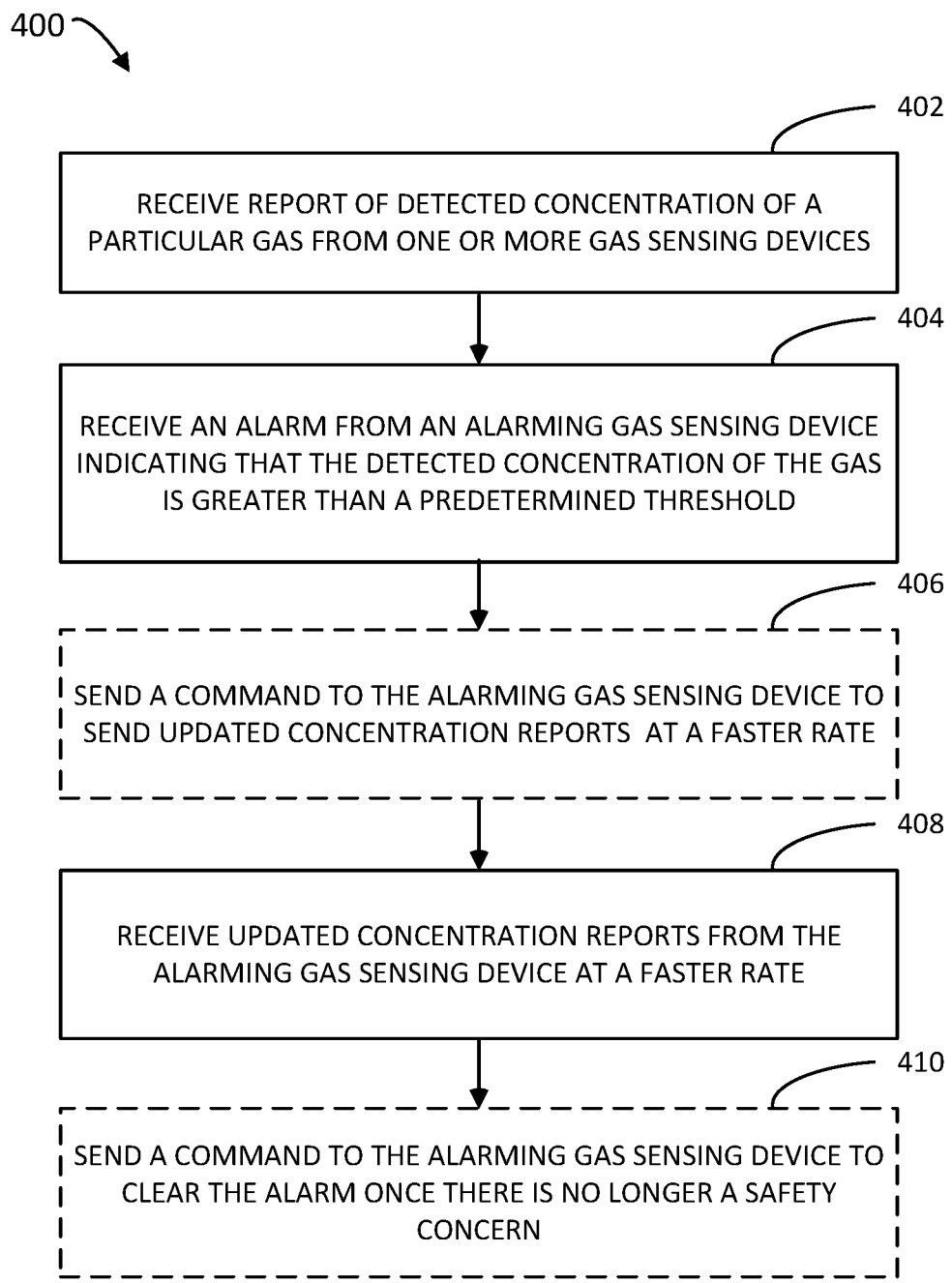
FIG. 4 is a flow diagram of an example leak detection process from the perspective of a data collection device, according to embodiments of this disclosure.

FIG. 4 is a flow diagram of an example leak detection process 400 from the perspective of a data collection device (e.g., device 116 or 118), according to embodiments. At 402, the data collection device may receive reports of detected concentration (e.g., in parts per million (ppm) or as a percentage of the surrounding air, or as a percentage of LEL, etc.) of a particular gas (e.g., methane) from one or more gas sensing devices (e.g. devices 106-114, which may be located at various locations (e.g., homes, businesses, etc.)). The gas concentration reports may be received from each sending gas sensing device on a predetermined schedule respectively associated with each gas sensing device. At 404, an alarm may be received from one of the gas sensing devices indicating that a detected concentration of the gas is greater than a predetermined threshold. This may indicate a possible (and potentially dangerous) gas leak and is reported as it may warrant further investigation. In an embodiment, the data collection device, in response to receiving the alarm and due to potential urgency, may send, at 406, a command to the alarming gas sensing device to send updated gas concentration reports at a faster rate than its normal reporting schedule. At 408, the data collection device may receive updated gas concentration reports from the alarming gas sensing device at the faster rate. In an embodiment, the gas sensing device may automatically send updated reports without a request from the data collection device. Once there is no longer a safety concern, at 410, the data collection device may send a command to the alarming gas sensing device to clear the alarm. In an embodiment, the alarming gas sensing device may clear the alarm automatically once the detected concentration of the gas is no longer greater than the predetermined threshold.

Figure 5:
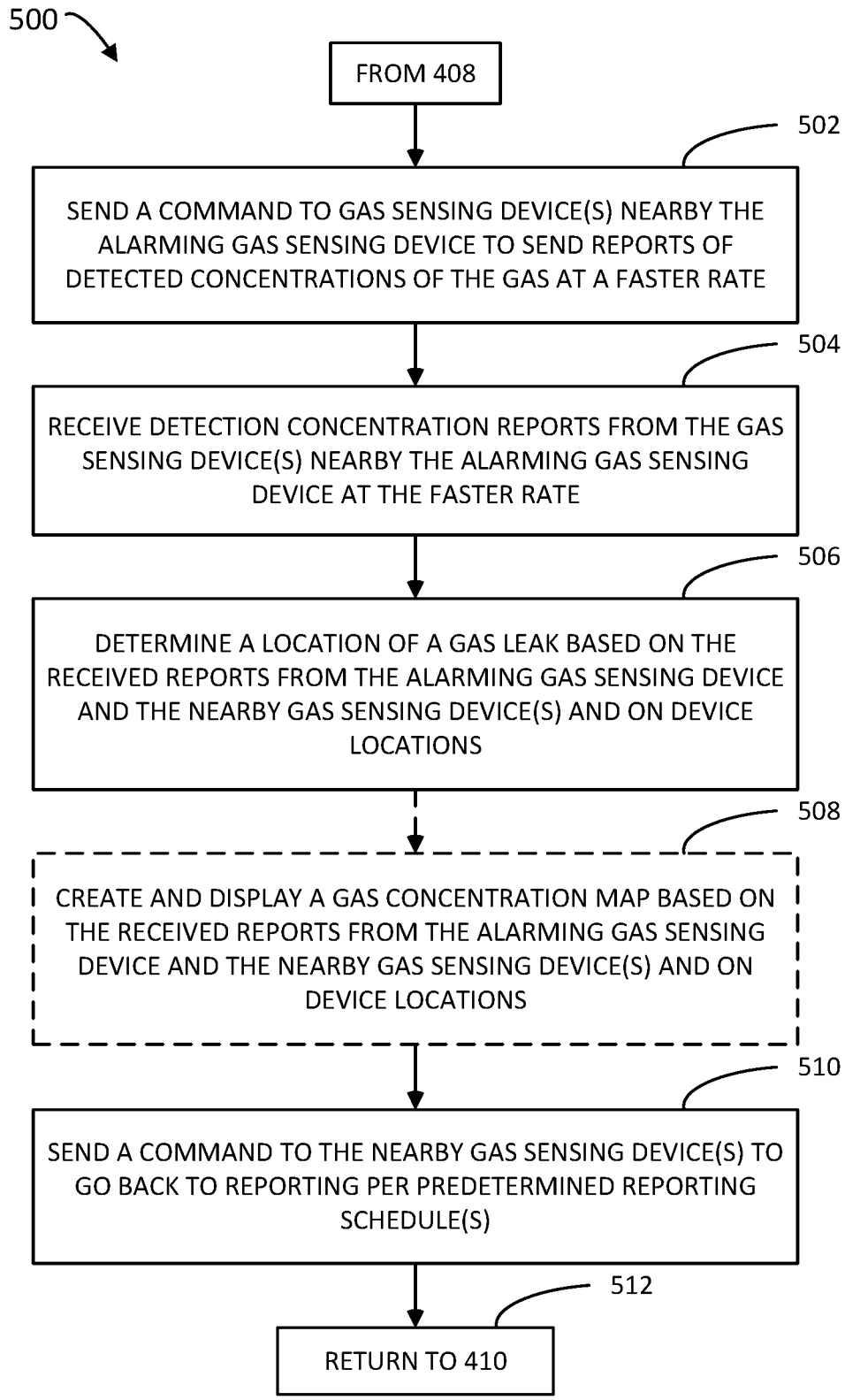
FIG. 5 is a flow diagram of an example leak location determination process from the perspective of a data collection device, according to embodiments of this disclosure.

FIG. 5 is a flow diagram of an example leak location determination process 500 from the perspective of a data collection device (e.g., device 116 or 118), according to embodiments. Process 500 begins from block 408 of process 400 of FIG. 4. At 502, a command may be sent from the data collection device to one or more gas sensing devices that are neighboring, or nearby, the alarming gas sensing device to send reports/updates of detected concentrations of the gas at a faster rate than their normal reporting schedules. At 504, the reports/updates may be received from the nearby gas sensing device(s) at the faster rate. At 506, the data collection device may determine a probable location of a gas leak. In an embodiment, the location of the gas sensing device with the highest reading may be a good indication of a location of a gas leak. In another embodiment, the location of a gas leak may be determined by triangulating the received updates from the alarming gas sensing device and the nearby gas sensing device(s) based on the device locations, weighting of received gas concentration data, etc. The device locations may be determined in various ways known to a person of ordinary skill in the relevant arts (e.g., via cellular triangulation, a GPS and/or altimeter associated with each device, etc.). For example, latitude and longitude values for each gas sensing device may be known or recorded at the time of installation, and these values may be averaged to determine a possible location of a gas leak. For a more accurate location determination, the latitude and longitude values may be weighted by the level of concentration measured at each device. The triangulation may also be based on other factors, including wind speed and direction, street layout, building topology (e.g., tallness/configurations of buildings), etc. Optionally, at 508, the data collection device may create and display a gas concentration map based on the received updates from the alarming gas sensing device and the nearby gas sensing device(s) and on the device locations. The gas concentration map may be further based on wind speed/direction, street layout, building topology, etc. The gas concentration map may help a user (e.g., utility/field technician) to visually identify a probable location of a gas leak in an expedient manner. Once there is no longer a need for data from the nearby gas sensing device(s), at 510, the data collection device may send a command to the nearby gas sensing device(s) to go back to reporting per predetermined reporting schedule(s). At 512, the process may continue at 410 of FIG. 4.

Figure 6A:
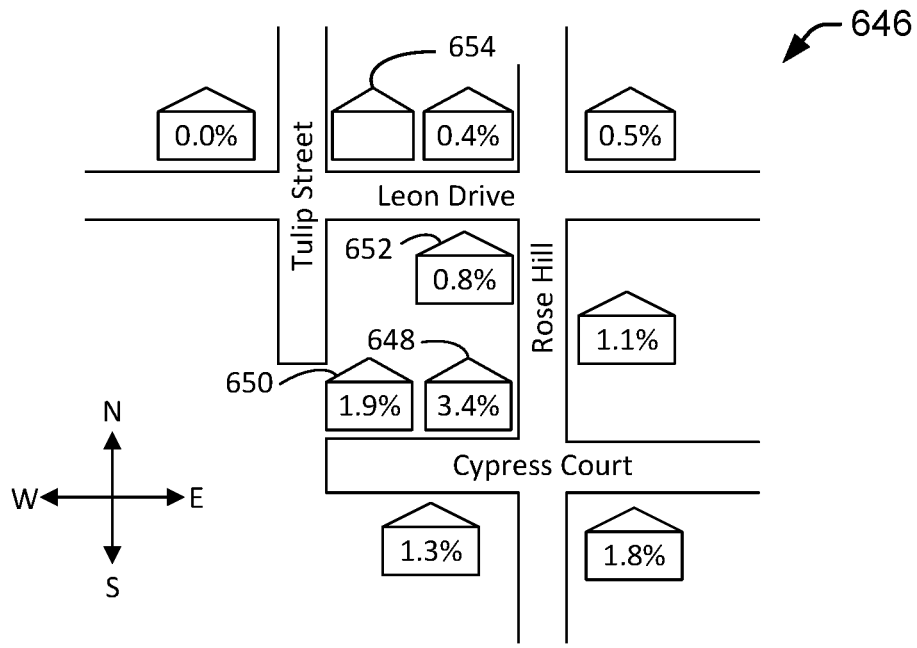
FIGS. 6A and 6B are block diagrams of example gas concentration maps, according to embodiments of the present disclosure.
Figure 6B:
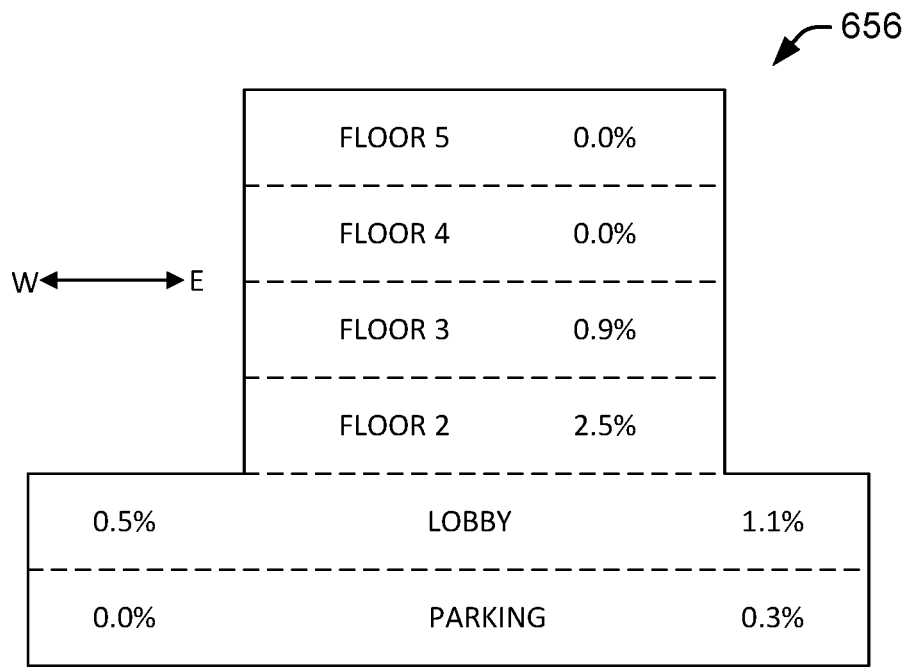

Two examples of gas concentration maps are shown in FIGS. 6A and 6B, according to embodiments. FIG. 6A includes a gas concentration map 646 that depicts a housing community, showing locations of houses along neighborhood streets. The houses may be equipped with gas sensing devices, such as devices 106-114 of FIG. 1. The gas sensing devices may have been included in conjunction with gas metering devices installed at each house, for example. The houses on map 646 show readings of the respective gas sensing devices (i.e., detected concentrations of the gas) at each location. The readings may be updated on a predetermined basis to show reading changes (e.g., every 20 seconds or other set interval, which may be user selectable). In the embodiment shown, the readings are shown as a concentration or volume percentage of the surrounding air. In other embodiments, readings may be shown in other units (e.g., parts per million (ppm)). In an embodiment, a user may be able to choose what units are shown. According to the example shown in FIG. 6A, the gas sensing device at house 648 is showing the highest reading, which may indicate the location of a gas leak. Based on the readings at the other houses, it appears that there may be wind coming from the northwest that may be blowing the gas in a southeast direction. In an example, if triangulation is used based on the shown data, and taking the wind into account, the results of the triangulation analysis may indicate that a gas leak may be occurring in the vicinity of houses 648, 650, and 652, for example. As can be seen in FIG. 6A, house 654 is not showing a reading. This may be because there is no gas sensing device at that location, or it may indicate that the gas sensing device at that location is faulty or not operational. Thus, while gas concentration map 646 may primarily be used to pinpoint a location of a possible gas leak, it may also indicate other problems in the system that may warrant repair or correction.

FIG. 6B includes a gas concentration map 656 that depicts a layout of an example multi-floor building having a parking level (which may be underground), a lobby level (e.g., as a first floor), and four additional floor levels. One or more gas sensing devices may be installed on one or more levels. As gas metering devices for a multi-floor building are normally banked together in one or more locations, the gas sensing devices may not be associated with a particular metering device, or any metering device. In the example shown, two gas sensing devices are located on each of the parking and lobby levels, and one gas sensing device is located on each of the additional floor levels. This is by way of example and not limitation, as any number of gas sensing devices may be used at any locations (e.g., in each individual apartment or business office, etc.). As in the example shown, each depicted level of the building may show readings of the respective gas sensing devices at each location. The readings may be updated on a predetermined basis to show reading changes (e.g., every 20 seconds or other set interval, which may be user selectable). In the embodiment shown, the readings are shown as a concentration or volume percentage of the surrounding air. In other embodiments, readings may be shown in other units (e.g., parts per million (ppm)). In an embodiment, a user may be able to choose what units are shown. The exact global positions of the gas sensing devices may be very close, as they are all located in the same multi-floor building. However, their altitudes within the building may be distinguishably different. In the example shown, the gas sensing device on Floor 2 indicates the highest concentration of a gas in the air, and the gas sensing device on the east side of the lobby indicates the next highest concentration. This data (e.g., when triangulated) may indicate the presence of a gas leak somewhere between Floor 2 and the lobby, likely on the east side. With this information, if an evacuation is warranted, it would likely be safest to have occupants evacuate using stairwells located on the west side of the building. Thus, a concentration map may be useful in determining public safety options as well as determining a location of a possible gas leak.

While gas concentration maps 646 and 656 may be used by both a data collection device 116 (e.g., located at a central office) and/or a mobile data collection device 118 (e.g., a mobile or handheld device used by a field technician), these maps may be especially useful, and quite important, when used on a mobile data collection device 118 in the field, because having this data in real time in the vicinity of a potential gas leak may help a field technician make quick decisions regarding whether, and how, an immediate evacuation of the area needs to occur and/or whether it is safe enough to allow technicians to be working in the area. Having this capability may allow for real-time crisis management of a potentially very dangerous situation that may not be as efficient if managed solely by a remote central office.

Figure 7:
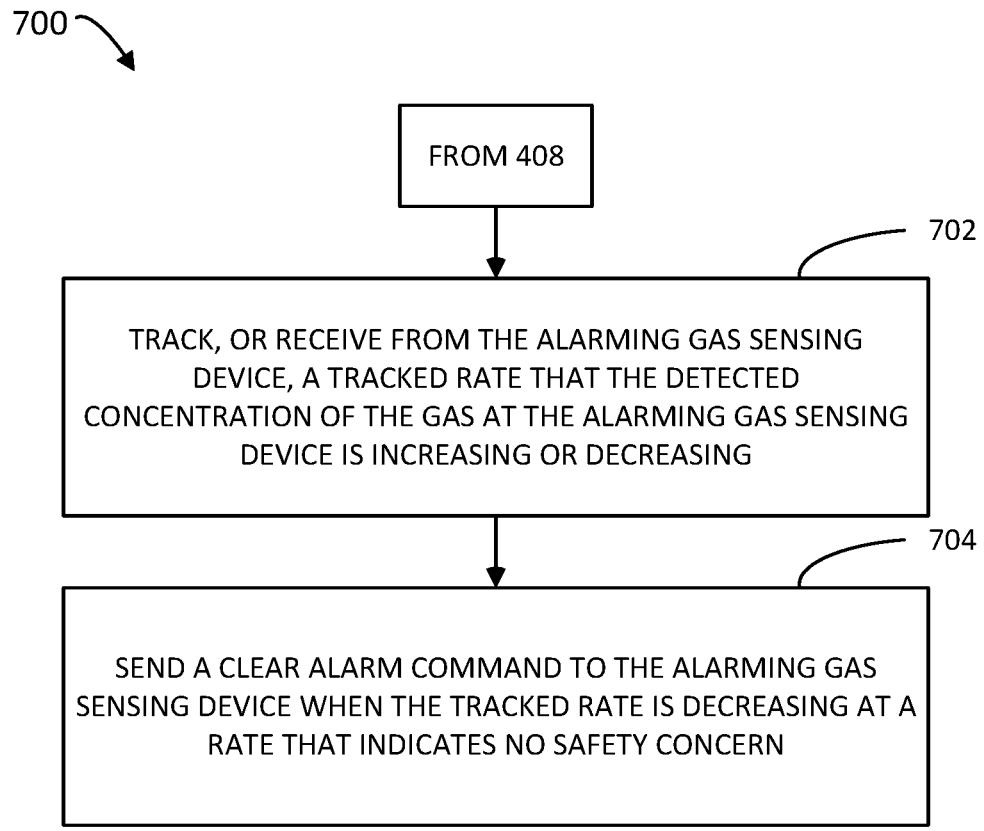
FIG. 7 is a flow diagram of an example leak rate tracking process from the perspective of a data collection device, according to embodiments of this disclosure.

FIG. 7 is a flow diagram of an example leak rate tracking process 700 from the perspective of a data collection device, according to embodiments. Process 700 begins from block 408 of process 400 of FIG. 4. At 702, a rate that the detected concentration of the gas at the alarming sensing device is increasing or decreasing may be tracked, or received from the alarming sensing device. At 704, a clear alarm command may be sent to the alarming gas sensing device when the tracked rate is decreasing at a rate that indicates no safety concern. This may occur, for example, if a leak was repaired, if the gas was shut off in the location of the leak, or if the gas was detected due to the gas supply system providing temporary (usually very brief) venting in order to relieve built-up pressure in the system.

One or more features disclosed herein may be implemented in hardware, software, firmware, and/or combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

A processing platform of a data collection device (e.g., data collection device 116 or mobile data collection device 118 of FIG. 1), and/or a gas sensing device (e.g., any of devices 106-114) may be embodied in any type of mobile and/or non-mobile computing device. Examples of mobile devices may include, but are not to be limited to, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile interne devices (MIDs), mobile messaging devices, mobile data communication devices, mobile media playing devices, cameras, mobile gaming consoles, wearable devices, mobile industrial field devices, etc. Examples of non-mobile devices may include, but are not to be limited to, servers, personal computers (PCs), Internet appliances, televisions, smart televisions, data communication devices, media playing devices, gaming consoles, industrial field devices, etc.

Figure 8:
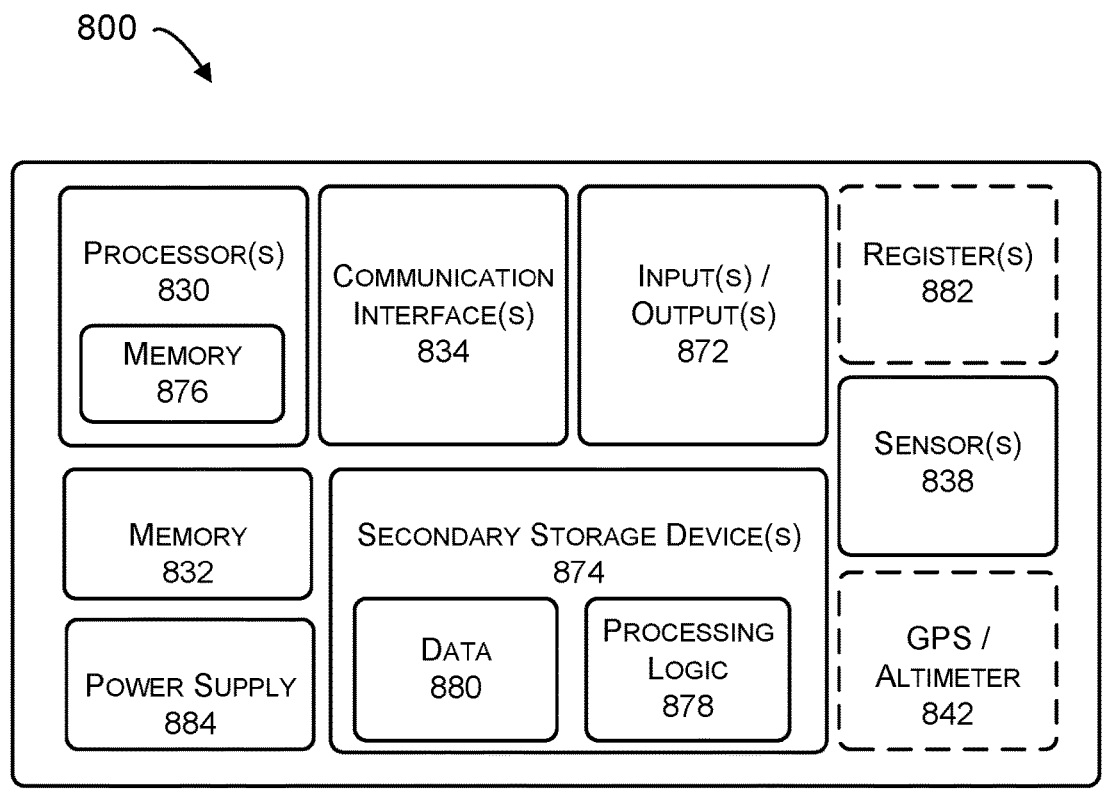
FIG. 8 is a block diagram of an example gas sensing device, according to an embodiment of the present disclosure.

FIG. 8 is a block diagram of an example gas sensing device, according to embodiments. Processing platform 800 may include one or more processors 830, memory 832, one or more secondary storage devices 874, one or more input/output devices 872, and/or one or more communication interfaces 834, in communication via a bus, line, or similar implementation (not shown). Processing platform 800 may also include a power supply 884, which may include an interface to an electricity source and/or may include one or more batteries. Platform 800 may also include one or more sensors 838, including at least one gas sensor, for example. In an embodiment, platform 800 may also include a GPS (for location determination) and/or an altimeter (for altitude determination (e.g., which floor(s) of a building)) device 842. In an example where a gas sensing device is incorporated into a utility meter, platform 800 may also include one or more registers 882 for flow measurement, for example.

Processor(s) 830 may be implemented by, for example but not limitation, one or more integrated circuits, logic circuits, microprocessors, controllers, etc. Processor(s) 830 may include a local memory 876 (e.g., a cache). Memory 832 may include a volatile and/or a non-volatile memory. Volatile memory may be implemented by, for example but not limitation, Synchronous Dynamic Random Access Memory (SDRAM), Dynamic Random Access Memory (DRAM), RAMBUS Dynamic Random Access Memory (RDRAM) and/or any other type of random access memory device. Non-volatile memory may be implemented by flash memory and/or any other desired type of memory device. Access to memory 832 may be controlled by a memory controller (not shown). Data stored in local memory 876 and/or memory 832 may be used by processor(s) 830 to facilitate sensor data collection functions, metering functions if embodied in a utility meter, and/or communications, according to embodiments of this disclosure.

Input/output device(s) 872 may allow a user to interface with processor(s) 830. Input devices may allow a user to enter data and/or commands for processor(s) 830. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output device(s) 872 may be connected to processor(s) 830, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 834 may be implemented in hardware or a combination of hardware and software, and may provide wired or wireless network interface(s) to one or more networks, such as network(s) 104 of FIG. 1. Communication interface(s) 834 may be a part of, or connected with, the interface circuit discussed above, and/or may include or connect with communication devices such as a transmitter, a receiver, a transceiver, a modem and/or network interface card to facilitate exchange of data with external devices (e.g., computing devices of any kind) via a network, such as network(s) 104.

Secondary storage device(s) 874 may store processing logic 878 (e.g., software) to be executed by processor(s) 830, and/or may store data 880. Processing logic 878 and data 880 may be used by processor(s) 830 to facilitate sensor data collection functions, metering functions if embodied in a utility meter, and/or communications between devices, according to embodiments of this disclosure. Processing logic 878 may include instructions for executing the methodology described herein for a gas sensing device, for example. Examples of secondary storage device(s) 874 may include one or more hard drive disks, compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 874.

Figure 9:
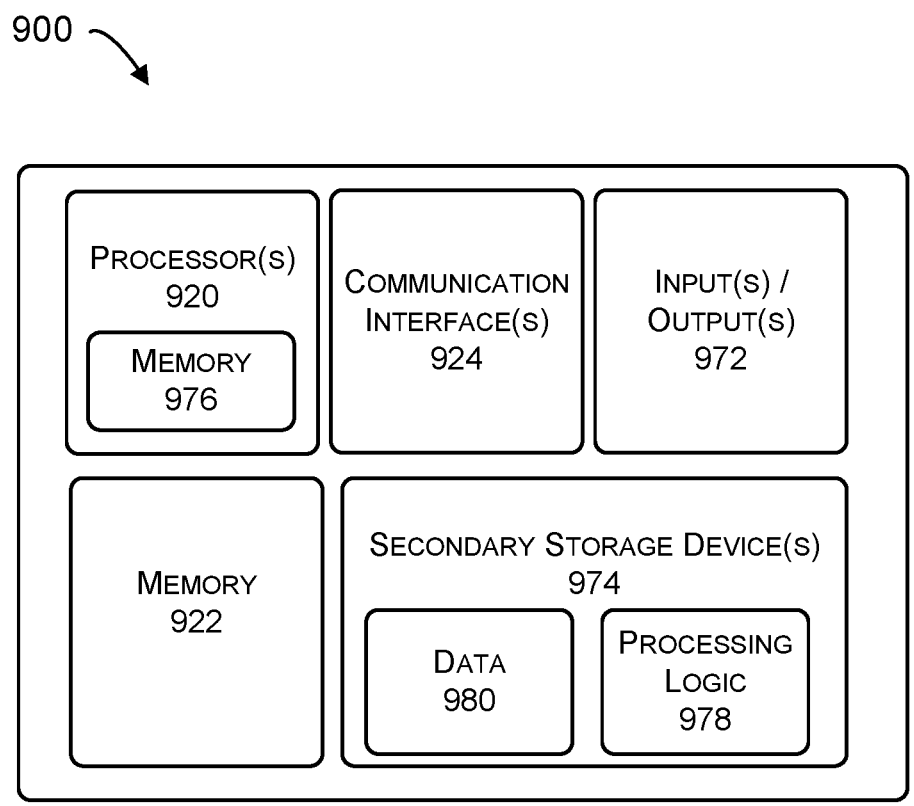
FIG. 9 is a block diagram of an example data collection device, according to an embodiment of the present disclosure.

FIG. 9 is a block diagram of an example mobile or non-mobile device data collection device, according to embodiments. Processing platform 900 may include one or more processors 920, memory 922, one or more secondary storage devices 974, one or more input/output devices 972, and/or one or more communication interfaces 924, in communication via a bus, line, or similar implementation (not shown). Processing platform 900 may also include a power supply (not shown), which may include an interface to an electricity source and/or may include one or more batteries.

Processor(s) 920 may be implemented by, for example but not limitation, one or more integrated circuits, logic circuits, microprocessors, controllers, etc. Processor(s) 920 may include a local memory 976 (e.g., a cache). Memory 922 may include a volatile and/or a non-volatile memory. Volatile memory may be implemented by, for example but not limitation, Synchronous Dynamic Random Access Memory (SDRAM), Dynamic Random Access Memory (DRAM), RAMBUS Dynamic Random Access Memory (RDRAM) and/or any other type of random access memory device. Non-volatile memory may be implemented by flash memory and/or any other desired type of memory device. Access to memory 922 may be controlled by a memory controller (not shown). Data stored in local memory 976 and/or memory 922 may be used by processor(s) 920 to facilitate data collection functions and/or communications, according to embodiments of this disclosure.

Input/output device(s) 972 may allow a user to interface with processor(s) 920. Input devices may allow a user to enter data and/or commands for processor(s) 920. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output device(s) 972 may be connected to processor(s) 920, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 924 may be implemented in hardware or a combination of hardware and software, and may provide wired or wireless network interface(s) to one or more networks, such as network(s) 104 of FIG. 1. Communication interface(s) 924 may be a part of, or connected with, the interface circuit discussed above, and/or may include or connect with communication devices such as a transmitter, a receiver, a transceiver, a modem and/or network interface card to facilitate exchange of data with external devices (e.g., computing devices of any kind) via a network, such as network(s) 104.

Secondary storage device(s) 974 may store processing logic 978 (e.g., software) to be executed by processor(s) 920, and/or may store data 980. Processing logic 978 and data 980 may be used by processor(s) 920 to facilitate data collection functions and/or communications between devices, according to embodiments of this disclosure. Processing logic 978 may include instructions for executing the methodology described herein for a data collection device, for example. Examples of secondary storage device(s) 974 may include one or more hard drive disks, compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 974.

The embodiments described herein provide quick detection and location identification of gas leaks, using a low-cost, low-power-consumption solution that may contribute to public safety and possibly save lives. The particular examples and scenarios used in this document are for ease of understanding and are not to be limiting. Though described for use with data collection from battery-powered devices used for gas utility metering, features described herein may be used in many other contexts and situations that may or may not involve battery power or gas utility metering. The power/cost-saving features discussed herein may be beneficial in many other systems involving sensing devices of many types, including other utility metering systems and other types of systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A gas sensing device, comprising:
   at least one processor;
   a communications system communicably coupled with the at least one processor, the communications system configured to communicate with at least one other device, including a data collection device, over a network;
   at least one gas sensor; and
   a memory communicably coupled with the at least one processor, the memory configured to store detected concentrations of a particular gas detected by the at least one gas sensor,
   wherein the at least one processor is configured to:
      send reports of the detected concentrations of the gas to the data collection device per a predetermined schedule or in response to an unscheduled request;
      determine whether a latest detected concentration of the gas is greater than a predetermined threshold; and
      automatically, without a request from the data collection device, upon determination that the latest detected concentration of the gas is greater than the predetermined threshold, send updated reports of the detected concentrations of the gas to the data collection device at a rate faster than that provided by the predetermined schedule.

2. The sensing device of claim 1, wherein the associated gas sensor is a micro-electro-mechanical systems (MEMS) sensor.

3. The sensing device of claim 1, wherein the at least one processor is further configured to, when the latest detected concentration of the gas is greater than the predetermined threshold, trigger an alarm and send an alarm message to the data collection device.

4. The sensing device of claim 3, wherein the at least one processor is further configured to track a rate that the detected concentration of the gas is increasing or decreasing.

5. The sensing device of claim 4, wherein the at least one processor is further configured to:
   determine whether the tracked rate indicates a decrease in concentration of the gas at a rate at which there is no safety concern; and
   clear the alarm when the tracked rate is determined to indicate no safety concern.

6. The sensing device of claim 4, wherein the at least one processor is further configured to:
   provide the tracked rate to the data collection device; and
   receive a clear alarm command from the data collection device when the data collection device determines that the tracked rate indicates a decrease in concentration of the gas at a rate at which there is no safety concern.

7. The sensing device of claim 1, wherein the data collection device is a computing device at a central utility office.

8. The sensing device of claim 1, wherein the data collection device is a mobile field computing device.

9. The sensing device of claim 1, wherein the sensing device is part of a gas metering device.

10. A method of gas detection, comprising:
    sending, by a processor of a gas sensing device to a data collection device, reports of detected concentrations of a particular gas by an associated gas sensor of the gas sensing device in communication with the processor, the sending being per a predetermined schedule or in response to an unscheduled request by the data collection device;
    determining whether a latest detected concentration of the gas is greater than a predetermined threshold; and
    when the latest detected concentration of the gas is greater than the predetermined threshold, automatically sending by the processor, without a request from the data collection device, updated reports of detected concentrations of the gas to the data collection device at a rate faster than that provided by the predetermined schedule.

11. The method of claim 10, further comprising:
    when the latest detected concentration of the gas is greater than the predetermined threshold, triggering an alarm and sending an alarm message to the data collection device.

12. The method of claim 11, further comprising:
    tracking a rate that the detected concentration of the gas is increasing or decreasing.

13. The method of claim 12, further comprising:
    determining whether the tracked rate indicates a decrease in concentration of the gas at a rate at which there is no safety concern; and
    clearing the alarm when the tracked rate is determined to indicate no safety concern.

14. The method of claim 12, further comprising:
    providing the tracked rate to the data collection device; and
    receiving a clear alarm command from the data collection device when the data collection device determines that the tracked rate indicates a decrease in concentration of the gas at a rate at which there is no safety concern.

15. A non-transitory computer-readable medium having computer program logic stored thereon, the computer program logic including instructions to cause a processor of a gas sensing device to:
    send, to a data collection device, reports of detected concentrations of a particular gas measured by an associated gas sensor of the gas sensing device in communication with the processor, the sending being per a predetermined schedule or in response to an unscheduled request by the data collection device;
    determine whether a latest detected concentration of the gas is greater than a predetermined threshold; and
    when the latest detected concentration of the gas is greater than the predetermined threshold, automatically send by the processor, without a request from the data collection device, updated reports of detected concentrations of the gas to the data collection device at a rate faster than that provided by the predetermined schedule.

16. The computer-readable medium of claim 15, further comprising:
    when the latest detected concentration of the gas is greater than the predetermined threshold, triggering an alarm and sending an alarm message to the data collection device.

17. The computer-readable medium of claim 16, wherein the instructions further cause the processor to:
    track a rate that the detected concentration of the gas is increasing or decreasing.

18. The computer-readable medium of claim 17, wherein the instructions further cause the processor to:
    determine whether the tracked rate indicates a decrease in concentration of the gas at a rate at which there is no safety concern; and
    clear the alarm when the tracked rate is determined to indicate no safety concern.

19. The computer-readable medium of claim 17, wherein the instructions further cause the processor to:
    provide the tracked rate to the data collection device; and
    receive a clear alarm command from the data collection device when the data collection device determines that the tracked rate indicates a decrease in concentration of the gas at a rate at which there is no safety concern.

20. A gas sensing device, comprising:
    at least one processor;
    a communications system communicably coupled with the at least one processor, the communications system configured to communicate with at least one other device, including a data collection device, over a network;
    at least one gas sensor; and
    a memory communicably coupled with the at least one processor, the memory configured to store detected concentrations of a particular gas detected by the at least one gas sensor,
    wherein the at least one processor is configured to:
      determine whether a latest detected concentration of the gas is greater than a predetermined threshold; and
      when the latest detected concentration of the gas is greater than the predetermined threshold,
        trigger an alarm and send an alarm message to the data collection device;
        track a rate that the detected concentration of the gas is increasing or decreasing;
        determine whether the tracked rate indicates a decrease in concentration of the gas at a rate at which there is no safety concern; and
        clear the alarm when the tracked rate is determined to indicate no safety concern.

* * * * *